United States Patent [19]

Newton et al.

[11] Patent Number: 4,568,029

[45] Date of Patent: Feb. 4, 1986

[54] METHOD AND APPARATUS FOR UNLOADING CATALYST FROM A TUBULAR REACTOR

[75] Inventors: Ceylon E. Newton, Beaumont, Tex.; Billy B. Burgin, Starks, La.; Vernon R. Morgan, Sr., Vidor, Tex.

[73] Assignee: PPG Industries, Inc., Pittsburgh, Pa.

[21] Appl. No.: 519,340

[22] Filed: Aug. 1, 1983

[51] Int. Cl.$^4$ ............................................. B02C 23/08
[52] U.S. Cl. ........................................ 241/24; 29/426.4; 241/58; 241/79; 241/283
[58] Field of Search ................... 29/426.4; 83/30, 691; 241/24, 58, 60, 79, 94, 283

[56] References Cited

U.S. PATENT DOCUMENTS

| | | | |
|---|---|---|---|
| 1,451,610 | 4/1923 | Gestas . | |
| 1,892,517 | 12/1932 | Pennington . | |
| 2,182,744 | 12/1939 | Emrsam | 164/85 |
| 2,341,817 | 2/1944 | Santucci | 241/94 X |
| 2,412,937 | 12/1946 | Allen | 77/58 |
| 2,463,455 | 3/1949 | Dann | 164/32 |
| 2,602,516 | 7/1952 | Gray | 166/20 |
| 2,707,028 | 4/1955 | Burton | 164/87 |
| 2,906,256 | 9/1959 | Glynn | 125/20 |
| 3,027,943 | 4/1962 | Reistle, Jr. | 166/33 |
| 3,041,905 | 7/1962 | Gabriel | 83/100 |
| 3,057,417 | 10/1962 | Sandvig | 175/212 |
| 3,065,791 | 11/1962 | Bearden et al. | 166/21 |
| 3,065,807 | 11/1962 | Wells | 175/321 |
| 3,073,387 | 1/1963 | Dunning et al. | 166/45 |
| 3,153,885 | 10/1964 | Keller et al. | 51/267 |
| 3,216,512 | 11/1965 | Grable | 175/71 |
| 3,880,047 | 4/1975 | Dosier | 90/12 D |
| 4,037,501 | 7/1977 | Gladow | 83/100 |
| 4,043,234 | 8/1977 | Godin et al. | 83/691 X |
| 4,051,752 | 10/1977 | Cawley | 83/5 |
| 4,131,042 | 12/1978 | Rich et al. | 83/100 |
| 4,208,154 | 6/1980 | Gundy | 408/204 |
| 4,253,531 | 3/1981 | Boros | 175/56 |

Primary Examiner—Howard N. Goldberg
Assistant Examiner—Timothy V. Eley
Attorney, Agent, or Firm—Irwin M. Stein

[57] ABSTRACT

Apparatus for unloading particulate catalyst, e.g., cylindrically shaped catalyst, from a multiplicity of elongated reactor tubes is described. The apparatus comprises, in combination, a plurality of coaxial hollow pipe members contiguously arranged and bundled in a pattern reflecting the geometric pattern of the reactor tubes. Each pipe member has a cutting element having an axial passageway throughout its length and slots in the lower wall of the element affixed at one end. The pipe members and cutting elements have diameters smaller than the reactor tubes so that the pipe members can be inserted therein. The other end of the pipe members terminate within a manifold which is connected to a vacuum source. Vibratory means which deliver a downward force are attached to the manifold. In operation, the bundle of pipe members is positioned above the reactor and in line with reactor tubes filled with catalyst and open at both ends. The pipe members are lowered into the reactor tubes and onto the top of the column of catalyst therein. The vibrator and vacuum source are activated. The downward force and the cutting elements fracture the catalyst into smaller pieces. The cuttings so produced are removed by suction from the reactor tube. The catalyst so removed is collected and precious metal values thereof can be recovered.

19 Claims, 5 Drawing Figures

METHOD AND APPARATUS FOR UNLOADING CATALYST FROM A TUBULAR REACTOR

DESCRIPTION OF THE INVENTION

The present invention relates to apparatus for removing particulate catalyst from a multiplicity of elongated tubes. More particularly, the present invention relates to apparatus for removing cylindrically-shaped catalyst particles from the elongated reactor tubes of a tubular reactor, and the method for removing such catalyst.

Many fixed-bed catalytic reactors are in essence a shell and tube heat exchanger containing a multiplicity of elongated tubes. These tubes are filled with a large number of particulate catalyst granules or pellets. The catalyst typically comprises an inert carrier coated with the active catalyst specie. When the activity of the catalyst diminishes to a level where continued use is no longer economically justified, the catalyst must be removed from the reactor and replaced with a fresh charge of catalyst. In view of the very large number of reactor tubes typically found in a reactor of the aforedescribed type, the time required to unload the catalyst from the reactor can be lengthy. However, it is desirable to keep this time as short as possible in order to maintain a high level of reactor on-stream time and, hence, improved production capacity. In addition, the catalyst must be removed from the reactor tubes without damaging the reactor.

The diameter of elongated reactor tubes can be relatively small, e.g., 1-inch outside diameter. When the shape of the catalyst used to fill the reactor tube is spherical and is substantially smaller than the inside diameter of the reactor tube, removal of such catalyst from the reactor tube does not pose much difficulty. In such a case, the catalyst usually can be made to flow readily out the bottom of the reactor tube after the catalyst supporting elements are removed. However, when the catalyst particle is nonspherical and/or has a dimension which occupies a significant portion of the diameter of the reactor tube, removal of such catalyst from the reactor tubes is much more difficult. Such particulate catalysts have a tendency to bridge within the reactor tube, thereby making its removal more difficult and time consuming.

It is an object of the present invention to provide a method and apparatus for the efficient removal of particulate catalyst, particularly non-spherical particulate catalyst, from a tubular reactor composed of a multiplicity of elongated tubes, each tube being filled with a column of such catalyst.

Another object of the present invention is to accomplish the removal of particulate catalyst from a tubular reactor without damage to the reactor tubes.

A further object of the present invention is to provide a catalyst unloader which is relatively easy to construct and operate.

The catalyst unloader tool of the present invention comprises certain novel features of construction, arrangement and combination of parts, as hereinafter fully described and/or illustrated in the accompanying drawings and descriptions, and as more particularly pointed out in the appended claims. For the purpose of facilitating and understanding the invention, there is illustrated in the accompanying drawings a preferred embodiment thereof. While one form of the invention is described in considerable detail in connection with the drawings, it will be understood by those skilled in the art that numerous modifications and variations therein will be apparent to those skilled in the art. The aforesaid preferred embodiments are intended as illustrative only.

BRIEF DESCRIPTION OF THE DRAWINGS

The invention may be more fully understood by reference to the accompanying drawings, in which.

DETAILED DESCRIPTION OF THE INVENTION

The present invention is directed to a novel catalyst unloading device which will remove particulate catalyst from the elongated tubes of a tubular reactor quickly and easily. When the useful life of a fixed bed catalyst contained in tubular reactor has expired, the reactor is shut down; the top and bottom covers of the reactor with appended piping removed; the supporting means upon which the column of catalyst particles rest removed; and, the catalyst discharged from the reactor tubes.

When the catalyst shape is spherical and has a diameter which does not occupy a significant portion of the inside diameter of the reactor tube, the catalyst can be discharged from the reactor tubes without too much difficulty. However, when the catalyst is non-spherical, irregular in shape and/or occupies a significant portion of the inside diameter of the reactor tube, e.g., pellets of $\frac{3}{8}$-$\frac{1}{2}$ inch length and $\frac{3}{8}$-$\frac{1}{2}$ inch diameter within a reactor tube having an inside diameter of, for example, of $\frac{7}{8}$ inch, removal of the catalyst presents a more difficult problem because such catalyst particles can and often do bridge within the reactor tube. Moreover, the catalyst particles can fuse to each other and to the reactor tube wall as a result of the elevated temperatures used typically for chemical reactions performed within such reactors, thereby making removal of the catalyst from the tubes more difficult.

It is not uncommon for a tubular reactor to contain in excess of 6,000 small diameter elongated tubes of, for example, 300 inches in length, a 1-inch outside diameter and an inside diameter of about $\frac{7}{8}$ inch. If it is necessary to manually remove the catalyst from each or a siginificant number of such reactor tubes, it is evident that such efforts would be labor intensive and time consuming. In addition, a large amount of airborne dust and catalyst particles can result from such a manual unloading operation, which is environmentally undesirable.

The catalyst unloading device of the present invention is designed to remove particulate catalyst, particularly non-spherical-shaped catalysts, having a significant particle size relative to the inside diameter of the reactor tube in which it is located from a tubular reactor having a plurality of reactor tubes. By the term "significant particle size" is meant that the catalyst particles are of such a size that bridging of such particles within the reactor tube can occur. Such particulate catalyst is to be distinguished from powdery materials or small spherical particles. The particulate catalyst to be removed by the device of the present invention can be in the form of pellets, cylinders or other geometric shapes.

Figure 1:
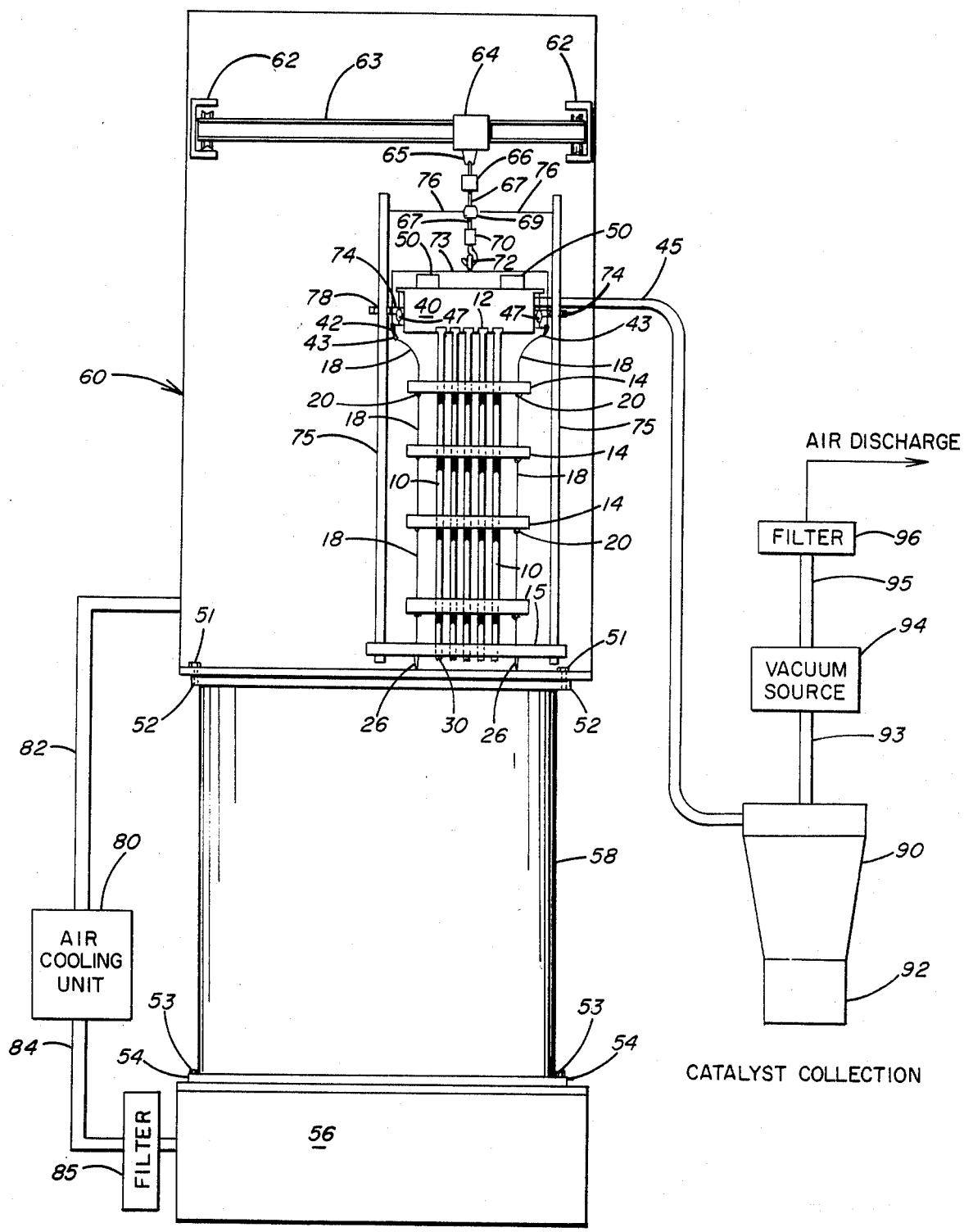
FIG. 1 is a schematic illustration of the catalyst unloader device of the present invention contained in a housing mounted on top of a tubular reactor, and also illustrates graphically a catalyst collector, vacuum source, filters and air cooling unit connected to said device and housing.
Figure 2:
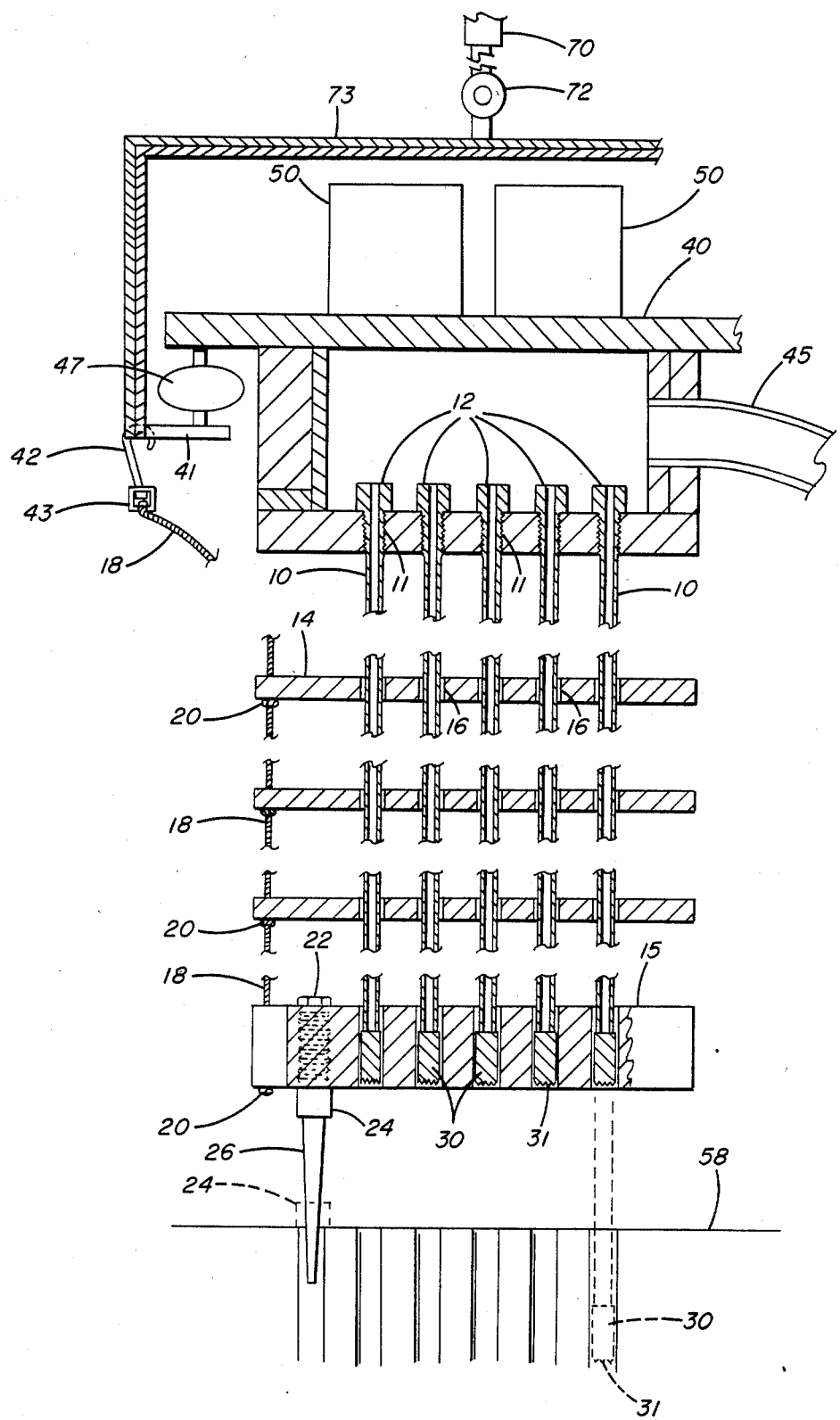
FIG. 2 is an elevation section view of the catalyst unloader device of FIG. 1.

Referring now to FIGS. 1 and 2, and, in particular to FIG. 1, there is shown a shematic illustration of the device of the present invention within a housing mounted atop a tubular reactor. More particularly, there is shown tubular reactor 58 upon which is mounted housing 60, which is securely attached to the reactor by means of bolts 53 connecting internal flanges (not shown) on the floor of the housing with external flanges 52 around the perimeter of the top of the reactor. The housing is generally cylindrical in shape with a diameter slightly larger than that of the tubular reactor. The height of the housing is sufficient to permit the device of the present invention and the auxiliary hoist assembly to be disposed vertically at its full height above the surface of the top tube sheet of reactor 58.

In a preferred embodiment, the upper section of housing 60 comprises a square box-like structure of a length and width equal to the diameter of the housing. The height of housing 60, which is usually a steel structure, will depend on the space needed to contain the trolley and bridge beams used to suspend the device and hoist assembly. The upper square section can be affixed to the lower cylindrical portion of the housing by art recognized means. Near the top and attached along each side of the upper square section of housing 60 are trolley beams 62. Suspended from trolley beams 62 by means of trolleys is bridge beam 63, which has attached thereto a further trolley 64. Although one bridge beam is shown in FIG. 1, it is contemplated that two or more bridge beams can be used, thereby providing the means to utilize two or more devices of the present invention simultaneously within housing 60. The trolleys suspending bridge beam 63 and the trolley 64 utilized to suspend the device of the present invention can be motor driven or manually operated, e.g., a chain operated trolley.

Hoisting assembly means 66 is suspended from trolley 64 by means of lines 65, e.g., a cable or chain. A hydraulic scale 70 is connected by means of line 67 to the usual swivel means 69 and the hoist assembly 66. A snap hook (not shown) at the bottom of hydraulic scale 70 is attached to lifting bail 72, which is attached to angle iron frame 73. Hydraulic scale 70 is connected to a pressure gauge (not shown) which is located within the housing where it can be easily read by an operator of the catalyst unloader device. The lifting assembly, i.e., the assembly for lifting and lowering the catalyst unloader, is vibrationally isolated from the unloader by four conventional inflatable vibration isolators or dampers 47 which are positioned below each corner of the top plate of manifold 40. Each vibration isolator 47 is attached to the bottom of the top plate of manifold 40 and horizontal member 41 of the angle iron frame 73. The use of such dampers concentrates the forces imparted by vibrators 50 downwardly into manifold 40 and avoids the loss of vertical force into the lifting assembly.

There is further shown a plurality of substantially vertical hollow pipe members 10 having substantially parallel vertical axes. These pipe members are mounted at their upper end within manifold 40 by means of bushings 12. At the opposite end of hollow pipe members 10 are attached cylindrical cutting elements 30. The length of each hollow pipe member is at least the length of the reactor tubes within the tubular reactor 58. The diameter of the hollow pipe member 10 is smaller than the diameter of the reactor tube so that the hollow pipe member and cutting element attached at its lower end can pass completely through the reactor tube smoothly. Preferably, the length of the hollow pipe member is slightly longer than the length of the reactor tube so that, in operation, the cutting element will traverse the entire length of the column of catalyst within the reactor tube. The hollow pipe members are arranged and bundled in a cluster which forms a pattern that corresponds to the geometric pattern of the reactor tubes. In a preferred embodiment, the top plate of manifold 40 is removable to permit assembly of the catalyst unloader device.

Spacer plates 14 are placed at substantially equal intervals along the length of the hollow tube members to provide lateral support for the pipe members. Each of the spacer and supporting plates 14 and the bottom guide plate assembly 15 has a plurality of guide holes 16 corresponding to the number and geometric arrangement of the pipe members. The guide holes in the spacer plates are of a diameter sufficiently large to readily allow reciprocal vertical movement of the pipe members through the spacer plates.

In a preferred embodiment, the spacer plates are suspended by means of flexible suspending lines 18 on each side of the cluster of pipe members. The lines 18 are tied to snap hook 42 and eye clip means 43 attached to horizontal members 41 on each side of the manifold. Each spacer plate 14 is maintained in its preset position when the unloader device is suspended above the reactor by knots 20 in the suspending line 18. The knots 20 provide support for each spacer plate, thereby preventing the spacer plates from sliding down line 18 to the bottom guide plate assembly 15. In addition, there are provided guide pipes 75 the entire length of the catalyst unloader device to assist in maintaining the device in a substantially vertical alignment with the reactor tubes. The guide pipes are parallel to pipe members 10, are rigidly affixed to the bottom guide plate assembly 15, and are connected to hoist swivel 69 by means of rods 76. Arms 74 extending from manifold 40 contain sleeves 78 to permit the catalyst unloader device to move vertically in reciprocal motion as the device is passed through and subsequently removed from the reactor tubes. Attached to the bottom of bottom guide plate 15 are alignment pins 26 for positive placement of the catalyst unloader device. The alignment pins are inserted into a reactor tube adjacent to those in which pipe members 10 are to be introduced and thereby align the pipe members and cutting elements directly above a reactor tube containing catalyst to be removed. The bottom guide plate 15 is typically thicker than the spacer plates 14 so that the cutting elements 30 are completely retracted within the bottom guide plate when the catalyst removal device is withdrawn and stationed above the reactor tube sheet.

Also shown in FIG. 1 is catalyst separation means 90 having removable catalyst storage container 92. Separation means 90 is connected to manifold 40 by flexible conduit 45. Separation means 90 can be any suitable device for separating solid particles from an entraining gas stream. Suitable separation equipment include a gravity settling chamber, impingement separators, cyclone separators, screens, impact-bed separators and metal filters. A cyclone-type separator is depicted in FIG. 1.

A vacuum source 94 is connected to separation means 90 by conduit 93. The gas discharge from vacuum source 94 is carried by conduit 95 to filter means 96, e.g., a dust collector, before the gas is discharged to the atmosphere. Any suitable means for separating catalyst fines or dust that may be contained in such gas stream, such as a bag filter, electrostatic precipitator, etc. can be used.

Securely attached to the bottom of tubular reactor 58 by means of bolts 53 and flanges 54 is bottom enclosure 56. Enclosure 56 serves to collect catalyst particles, granules, fines etc. falling out of the reactor tubes as the cutting elements 30 of the catalyst unloader device near and reach the bottom of the reactor tubes.

In a preferred method of operating the catalyst unloading device of the present invention, cool, dry air is provided to housing 60 near the bottom thereof by conduit 82, which is attached to air cooling unit 80. Air passing downwardly through the reactor tubes into the bottom enclosure 56 is recycled to air cooling unit 80 by means of conduit 84. A filter 85 is disposed in conduit 84 to remove dust and fine particles entrained by the recycled air. The cool air pumped to housing 60 is sufficiently dry to avoid corrosion, e.g., rusting, of the reactor tubes.

Mounted atop manifold 40 are vibratory means 50. As shown in FIG. 1, two vibrators are disposed on top of manifold 50. Any vibrator device which is capable of imposing a force in a downward direction parallel to the vertical axis of the hollow pipe members can be used. The vibrators can be air or electrically driven. Preferably, the vibrators are motor driven eccentric weight rotary electric vibrators which are synchronized to cancel the horizontal force moments delivered by the vibrators. The vibrators operate at high frequency and typically produce a force of from 5,400–8,000 pounds.

Referring now more particularly to FIG. 2, there is shown an elevation view, partially in cross section, of the catalyst unloader device. In particular, there is shown five hollow pipe members 10 securely affixed to manifold 40 by bushings 12 which are attached to the top of each tube 10. The bottom plate in manifold 40 contains a plurality of tapped holes 11 equal to the number of hollow pipe members used in the catalyst unloader device. The hollow pipe members of the device are clustered in a geometric pattern that miorrors the pattern of the reactor tubes in the tubular reactor. The downward force imparted to the manifold 40 by vibrators 50 is transmitted through the manifold to the hollow pipe members and ultimately to the cutting elements 30 attached to the bottom of each pipe member. Snap hooks 42 are attached to horizontal members 41 on each side of manifold 40 (only one side being shown in FIG. 2). Flexible suspending lines 18 are tied to eye clips 43, which are, in turn, each attached to snap hooks 42.

Also shown in FIG. 2 are cutting elements 30 with cutting teeth 31. Alignment pin 26 is attached to the bottom guide plate assembly 15 by threaded bolt 22. A collar 24 maintains the bottom of the bottom guide plate assembly 15 displaced from the top of the tube sheet of tubular reactor 58 to prevent damage to the tube sheet during movement of the unloader device from one set of reactor tubes to another.

Figure 4:
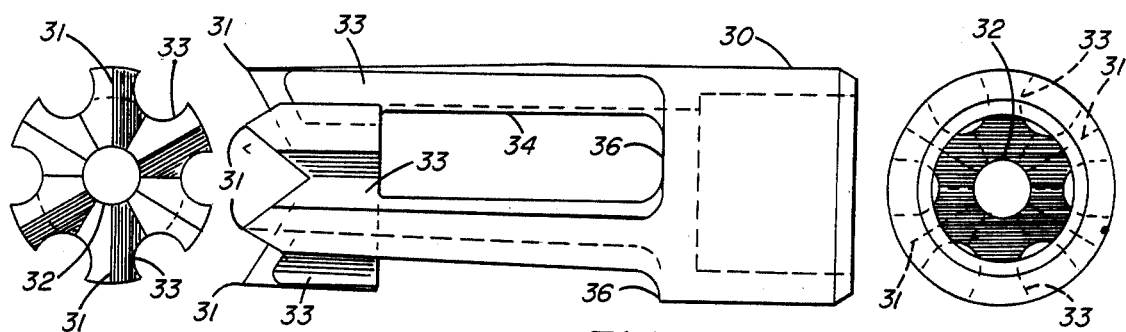
FIG. 4 is a plan view, including top and bottom ends, of the cutting element of FIG. 3.
Figure 3:
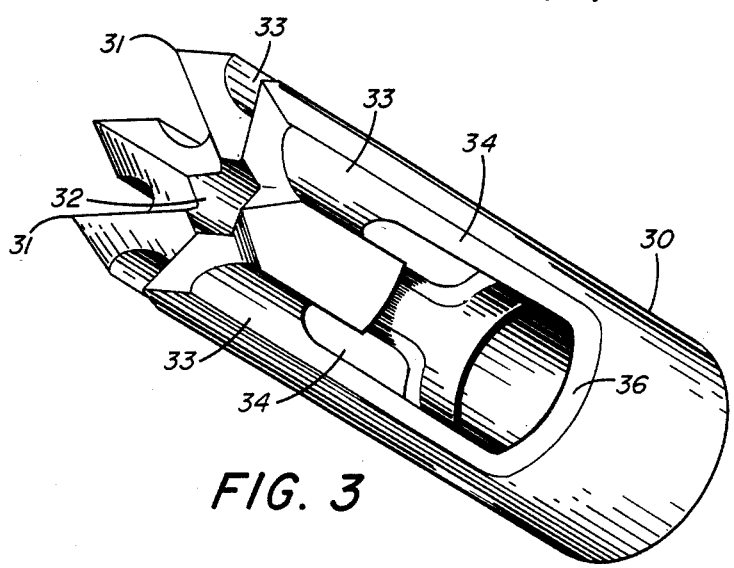
FIG. 3 is an isometric perspective view of a preferred cutting element attached to the bottom of the elongated pipe members of FIGS. 1 and 2.

Referring now to FIG. 3, there is shown an isometric perspective view of a preferred cutting element 30 which is attached to the bottom of each of the pipe members 10 described in connection with FIGS. 1 and 2. FIG. 4 is a plan view, including top and bottom ends of the cutting element of FIG. 3. Cutting element 30 comprises a generally cylindrical member with teeth 31 formed at the one end thereof. Although cutting element 30 is shown as being cylindrical, it need only be substantially cylindrical so as to fit easily within the reactor tube. Other geometric shapes which approach that of a cylinder, e.g., a mostly square shape with rounded corners, are contemplated. As shown in FIG. 3, a series of six cutting teeth are arranged substantially equally around the perimeter of the bottom of the cutting element. The teeth are essentially isosceles or equilateral triangles, the equal exposed sides of which are sharpened to cutting edges. The teeth and lower bottom end of the cutting element form a substantially hemispherical cavity having an axial passageway 32 at its center. Between these V-shaped cutting teeth 31 are grooves 33 to permit passage of comminuted catalyst granules. The cutting element is substantially hollow with an axial passageway 32 extending throughout its length, the axial passageway adjacent to the hemispherical cavity to about the height of the V-shaped cutting teeth, being smaller than the passageway from the top of the V-shaped cutting teeth to the point of attachment with pipe members 10. Three slots 34 are provided in the wall of the lower half of the cutting element, i.e., from the point of attachment of pipe member 10 to the top of the cutting teeth. These slots 34 are in open communication with the axial passageway 32 of the cutting element. The outside diameter of the cutting element is smaller than the diameter of the reactor tube. The cutting element can be attached to the bottom of the pipe member in any suitable conventional manner such as by welding, brazing, gluing or by a threaded attachment. As shown in FIG. 3, the diameter of the cutting element is slightly larger than that of pipe member 10 to permit the bottom of the pipe member to be in inserted into the cutting element down to lip 36. In the embodiment shown in FIG. 3, the tolerance between the inside diameter of the cutting element and outside diameter of the pipe member 10 is small so as to permit adhesive attachment of the cutting element to the bottom outside wall (about 1–2" in length) of the pipe member.

Figure 5:
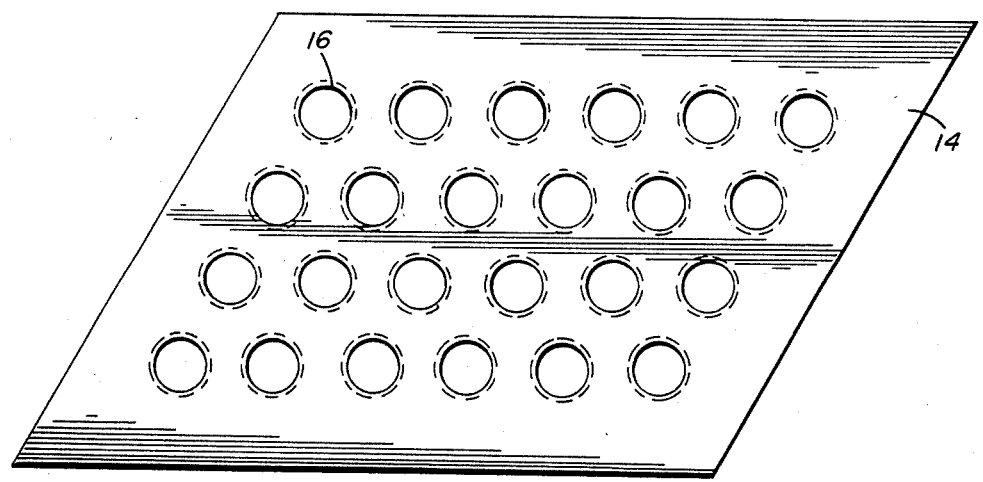
FIG. 5 is a top plan view of a spacer plate shown in FIG. 2 which has 24 guide holes for 24 pipe members.

FIG. 5 is a top plan view of a spacer plate 14 for a catalyst unloader device having 24 pipe members. As shown, the guide holes 16 in the spacer plate 14 are arranged in a manner reflective of twenty-four reactor tubes of the reactor 58. This permits the catalyst unloader device to cover the entire reactor tube pattern from one edge to the other edge of the reactor tube sheet cover without omitting catalyst containing reactor tubes. Although FIG. 5 illustrates a spacer plate for a bundle of 24 pipe members, the quantity of pipe members used for a specific catalyst unloader device can vary and will depend on various factors including the total number of tubes to be cleaned, the total weight of the unloader device which can be supported by the hoist assembly and auxiliary supporting beams, the space available to work on the top of the tubular reactor, whether more than one catalyst unloader device is to be used simultaneously, and the available downward vibrational force available. It is considered that catalyst unloader devices having from about 8 to about 55 pipe members preferably 24 to 28 or 30 pipe members, are particularly useful taking into account all of the aforementioned factors.

In utilizing the catalyst unloader device of the present invention, the top and bottom heads and appended piping of the tubular reactor are removed after the recator is shut down. Any supporting or compressive means, i.e., springs, within the reactor tubes to maintain the column of catalyst particles in a stationary mode are removed from the bottom and top respectively of each of the reactor tubes. Thereafter, the housing 60 and bottom enclosure 56 are securely affixed to the top and bottom of the reactor respectively. The catalyst unloader device is assembled and positioned above the reactor tube sheet. The manifold of the unloader device is connected to a vacuum source, catalyst separation means and collection chamber. The device is slowly lowered until the alignment pins engage the designated reactor tubes in the tube sheet. The pipe members are then lowered until each cutting element rests upon a column of catalyst particles within the reactor tubes. The vacuum source and the vibrators are activated thereby applying reciprocal vertical movement to the pipe members and cutting elements attached thereto. As a result of the vertical movement of the cutting elements, the catalyst particles are broken into smaller fragments. The resulting chips, granules, dust and small pieces of catalyst are drawn up through the axial passageway, along the grooves and through the slots of the cutting element, and thence upwardly through the pipe members by the negative pressure created by the vacuum source. From the pipe members, the catalyst particles generated by the pounding motion of the cutting elements are drawn into the manifold and out through the flexible conduit to the catalyst separation means and collection chamber.

The cluster of pipe members is lowered as rapidly as possible through the packed reactor tubes fragmenting and comminuting the catalyst particles readily until the cutting elements reach the bottom of the reactor tube. At this time, the granules of comminuted catalyst fall into the bottom enclosure attached to the bottom of the reactor. When the cutting elements emerge from the lower end of the reactor tubes, the hoist motor is reversed and the device raised until the cutting elements clear the top tube sheet. The device is then repositioned and the process repeated until all of the reactor tubes are cleared of catalyst.

The hydraulic scale 70 attached to cable 67 is connected to a pressure gauge located where it can be read easily by the operator of the unloader device. It is contemplated that the operator will stand on top of the reactor tube sheet. Generally, the column of catalyst particles supports from about 50 to 95 percent of the weight of the catalyst unloader device. At less than 50 percent, the penetration rate of the cutting elements through the catalyst falls off rapidly. If plugging of any of the hollow cutting elements should occur or if one or more but less than all of the cutting elements should encounter a severely fused section of catalyst. The hydraulic scale will show a decrease in the load being carried by the hoist assembly. In that event, the operator can take remedial action by reducing the speed at which the device is lowered, by raising the unloader device to dislodge catalyst that may be plugging a cutting element, or by raising the device entirely out of the reactor tube to manually remove catalyst plugs from the cutting elements or clear an obstruction within any of the reactor tubes.

The device of the present invention is capable of removing a column of catalyst particles about 25 feet in height in a total cycle time of from about 3 to about 20 minutes, e.g., 6 to 12, more commonly 8 to 10 minutes. Thus, with two catalyst unloader devices of 24–25 cutting elements each, it is possible to unload a catalyst charge from a tubular reactor containing about 6,700 tubes in about 8–48, e.g., 24–36 hours. The exact time required will, of course, depend on the total number of tubes, the hardness of the catalyst, and the extent to which the catalyst is fused to the reactor tubes, or otherwise tightly lodged therein.

The catalyst unloader device of the present invention provides a means for quickly unloading particulate catalyst from a tubular reactor in a safe and efficient manner. The device permit workers performing such unloading operations to work in substantially dust-free conditions, during inclement weather and otherwise under environmentally acceptable conditions. Moreover, the device of the present invention reduces the time required for removing catalyst (hence reducing the turn-around time) from a tubular reactor filled with catalyst, thereby improving reactor on-stream time.

The catalyst unloading device of the present invention is particularly useful for removing particulate catalyst, e.g., a silver-containing catalyst, from a tubular reactor used to produce ethylene oxide by oxidation of ethylene.

EXAMPLE

Two catalyst unloader devices of the type depicted in FIGS. 1–5 and having 24 cutting elements each where simultaneously operated from separate bridge cranes to unload a tubular reactor containing 6,742 tubes of about 1 inch outside diameter and about ⅝ inch inside diameter filled with catalyst pellets approximately ⅜ inch in diameter by ⅜ to ½ inch in length. The vibrators developed about 8,000 pounds of downward force at a frequency of about 3,450 cycles per minute. It was found that, on average, the unloader devices were capable of clearing 24 reactor tubes of the aforesaid catalyst in about 8 to about 10 minutes. The entire catalyst charge was removed from the aforesaid reactor in about 30 hours.

Although the present process has been described with reference to specific details of certain embodiments thereof, it is not intended that such details should be regarded as limitations upon the scope of the invention except as and to the extent that they are included in the accompanying claims.

We claim:

1. A method for removing particulate catalyst from the tubes of a tubular reactor having a multiplicity of reactor tubes arranged in a geometric pattern, which comprises:
(a) positioning above said reactor tubes containing said particulate catalyst a catalyst removal tool comprising:
   (1) a plurality of substantially vertical, hollow pipe members, each pipe member having a length at least that of said reactor tubes and a diameter smaller than the diameter of the reactor tube, said pipe members being clustered in a pattern matching the geometric pattern of the reactor tubes,
   (2) a substantially cylindrical cutting element rigidly affixed to the lower end of each pipe member, each cutting element having a diameter smaller than the diameter of the reactor tube, an axial passageway throughout its length, slots in the wall of the cutting element in open communication with said axial passageway, and a plurality of cutting teeth arranged around the perimeter of the bottom end of the cutting element, (3) a manifold to which the upper ends of the hollow pipe members is rigidly attached, said manifold being in open communication with said hollow pipe members, (4) a hoisting assembly for raising and lowering said manifold and cluster of hollow pipe members, (5) vibratory means attached to said manifold, which vibratory means imposes a force in a downward direction parallel to the vertical axis of said hollow pipe members, (b) connecting a vacuum source to the manifold of said catalyst removal tool, (c) activating the said vacuum source and vibratory means, (d) lowering the catalyst removal tool so that the cutting elements thereof engage particulate catalyst contained in the reactor tubes, thereby to break up the particulate catalyst into small pieces, (e) withdrawing small pieces of catalyst from the reactor tubes into the manifold of said tool, and (f) forwarding said small pieces of catalyst from said manifold to catalyst-air separation means.

2. The process of claim 1 wherein the reactor is a tubular reactor used to produce ethylene oxide and the particulate catalyst is a silver-containing catalyst.

3. The process of claim 2 wherein from 50 to 95 percent of the weight of the catalyst removal tool is supported by the column of catalyst in the reactor tubes.

4. The process of claim 2 wherein the catalyst removal tool is housed within a housing mounted atop the tubular reactor and cooled, dried air is forwarded to said housing.

5. The process of claim 2 wherein the silver content of the comminuted catalyst collected is subsequently recovered.

6. Apparatus for comminuting and removing particulate catalyst from the tubes of a tubular reactor having a multiplicity of reactor tubes arranged in a geometric pattern comprising, in combination:

(a) a plurality of substantially vertical, hollow pipe members, each pipe member having a length at least that of said reactor tubes and a diameter smaller than the diameter of the reactor tube, said pipe members being clustered in a pattern matching the geometric pattern of the reactor tubes, (b) a substantially cylindrical cutting element rigidly affixed to the lower end of each pipe member, each cutting element have a diameter smaller than the diameter of the reactor tube, an axial passageway throughout its length, slots in the wall of the cutting element in open communication with said axial passageway, and a plurality of cutting teeth arranged around the perimeter of the bottom end of the cutting element, (c) a manifold to which the upper ends of the hollow pipe members is rigidly attached, said manifold being in open communication with said hollow pipe members, (d) a hoisting assembly for raising and lowering said manifold and cluster of hollow pipe members, (e) vibratory means attached to said manifold, which vibratory means imposes a force in a downward direction parallel to the vertical axis of said hollow pipe members, (f) a vacuum source, and (g) conduit means connecting said vacuum source to said manifold.

7. The apparatus of claim 6 wherein the number of pipe members in the apparatus is from 8 to 55.

8. The apparatus of claim 6 wherein the number of pipe members in the apparatus is from 24 to 30.

9. The apparatus of claim 6 wherein the cutting teeth of the cutting element are shaped as triangles having equal sides, said sides of said triangles being sharpened to a cutting edge.

10. The apparatus of claim 9 wherein the cutting element contains six teeth arranged substantially equally around the perimeter with grooves between each of said teeth.

11. The apparatus of claim 6 wherein a plurality of spacer plates are arranged along the length of the hollow pipe members, each spacer plate having a plurality of guide holes corresponding to the number and geometric pattern of the pipe members in the cluster through which the pipe members travel, said spacer plates being attached one to the other and in turn to the manifold by flexible lines.

12. The apparatus of claim 6 wherein the apparatus is enclosed within a housing mounted atop the tubular reactor.

13. The apparatus of claim 12 wherein cooling means are operatively connected to the housing and a chamber mounted to the bottom of the tubular reactor which chamber collects comminuted catalyst exiting from the bottom of the reactor tubes.

14. The apparatus of claim 12 wherein a hydraulic scale is operatively connected to said hoisting assembly, said scale measuring the weight being carried by said hoisting assembly.

15. The apparatus of claim 14 wherein comminuted catalyst separation means and a catalyst collection chamber is connected to said conduit means leading to said vacuum source.

16. Apparatus for comminuting and removing non-spherical particulate catalyst from the tubes of a tubular reactor having a multiplicity of reactor tubes arranged in a geometric pattern comprising, in combination, (a) a plurality of substantially vertical, hollow pipe members, each pipe member having a length at least the length of said reactor tubes and a diameter smaller than the diameter of the reactor tube, said pipe members being arranged and bundled in a pattern reflective of the geometric pattern of the reactor tubes, (b) a cylindrical cutting element rigidly affixed to the lower end of each pipe member, each cutting element having a diameter smaller than the diameter of the reactor tube, an axial passageway throughout its length, slots in the wall of the cutting element communicating with said axial passageway, and a plurality of cutting teeth arranged substantially equally around the perimeter of the bottom end of the cutting element, said teeth and lower end of the cutting element forming a substantially hemispherical cavity having the axial passageway at its center, (c) a manifold to which the upper ends of the hollow pipe members is rigidly attached, said manifold being in open communication with said hollow pipe members and the axial passageway of the cutting element, (d) hoisting assembly means for raising and lowering said manifold and bundle of hollow pipe members, (e) vibratory means attached to said manifold, which vibratory means imposes a force in a downward direction parallel to the vertical axis of said hollow pipe members, (f) a plurality of lateral supporting plates disposed along the length of the hollow pipe members, each supporting plate having a plurality of guide holes corresponding to the number and geometric pattern of said pipe members in the bundle, said guide holes having a diameter sufficiently large to allow reciprocal vertical movement of said supporting plates along the length of said pipe members, said supporting plates being suspended from one another and in turn from the manifold by flexible line means, (g) a vacuum source, (h) conduit means connecting said vacuum source to said manifold, and (i) solid-gas separation means interposed in said conduit means for receiving comminuted particulate catalyst.

17. The apparatus of claim 16 wherein the supporting plate nearest to the cutting elements is sufficiently thick to completely enclose the cutting elements when the apparatus is fully extended above the reactor, said supporting plate having alignment pins attached to its bottom to provide for positive placement of the cutting elements above a reactor tube.

18. The apparatus of claim 16 wherein the cutting teeth of the cutting element are separated by grooves.

19. The apparatus of claim 18 wherein the cutting teeth of the cutting element are shaped as triangles having equal sides, said sides of said triangles being sharpened to a cutting edge.

* * * * *